252/99

United States Patent Office 3,413,229
Patented Nov. 26, 1968

3,413,229
POLYVINYL ALCOHOL COMPOSITIONS
Thomas S. Bianco, Hobart, and Edouard M. Kratz, Portage, Ind., assignors to Mono-Sol Division, Baldwin-Montrose Chemical Co., Inc., a corporation of Indiana
No Drawing. Original application Mar. 3, 1964, Ser. No. 349,176. Divided and this application Nov. 13, 1967, Ser. No. 698,083
4 Claims. (Cl. 252—90)

ABSTRACT OF THE DISCLOSURE

This invention relates to polyvinyl alcohol compositions containing a plasticizer and to plasticized polyvinyl alcohol films useful for laundry packets containing detergents and/or bleaches.

---

This invention is a divisional application of application Ser. No. 349,176, filed Mar. 3, 1964, now U.S. Patent No. 3,374,195.

This invention relates to polyvinyl alcohol compositions containing a plasticizer and to plasticized polyvinyl alochol films produced therefrom.

Polyvinyl alcohol is useful for packaging, coating, and other purposes, especially when formed into films or sheets. It is necessary for such purposes that the polyvinyl alcohol be plasticized, and, accordingly, various plasticizers have been employed. However, a need still exists for polyvinyl alcohol compositions that provide water soluble plasticized films having high resistance to varying atmospheric influences. There is a large demand for such films in the manufacture of water soluble bags or pouches from which packets or the like are produced containing such materials as detergents, bleaches, insecticides, medicinals, chemicals, dyes, pigments, industrial additives and other materials. The contents of the packets are dispensed merely by dropping the packets into water, whereupon the bags dissolve and release the contents into aqueous dispersion.

A film suitable for use in making packets of the foregoing type must be rapidly and completely soluble in both hot and cold water. It must be strong, tough, flexible, shock resistant, and non-tacky at high and especially low temperatures and humidities. Very importantly, these properties must be retained while the film is in contact with detergents, bleaches, and other materials which tend to affect the properties of the film. Such materials frequently are strongly desiccant, acting to dry out the bags, so that they are fragile and easily ruptured in handling.

It is, furthermore, very desirable that the polyvinyl alcohol film be readily self-sealable, especially by heat or heat and water sealing methods. The sealed portions should dissolve well with the remainder of the bags. Preferably, the film should seal completely and permanently at a relatively low temperature and in a short period of time, both to provide advantageous manufacturing operations and to preclude insolubilization of the polyvinyl alcohol, At the same time, it is desirable that the plasticizer not exude, since exudation interferes with sealing and also causes deposits to form on the film and imparts cloudiness to the film. It is also desirable that other discoloration be avoided.

It has now been discovered in accordance with the present invention that the foregoing and other objects, advantages and functions are achieved by employing a unique plasticizer combination of hydroxypropyl glycerine and a low molecular weight polyethylene glycol with hot (140° F.) and cold (75° F.) water soluble film-forming polyvinyl alcohol. A new composition is provided which is readily and reliably cast or otherwise formed into films and the like suitable for packaging and other purposes. The resulting films are rapidly hot and cold water soluble. They are resistant to various atmospheric conditions encountered, especially to low temperature conditions. They withstand impacts at low temperatures, and the resistance to impact is retained in the presence of detergents, bleaches, and the like. There is no objectionable migration of the plasticizer. The films have good self-sealing properties, and they remain non-tacky, clear and colorless.

In preferred embodiments of the invention, the polyvinyl alcohol employed is prepared by replacement of about 80–95%, preferably 85–90% of the acetate groups of polyvinyl acetate by hydroxyl groups. The polyvinyl alcohol preferably has a viscosity in 4% aqueous solution at 20° C. of at least about 20 centipoises, and more preferably, about 20–45 centipoises. The hydroxypropyl glycerine preferably is 1-methyl-2-hydroxyethyl glyceryl ether wherein an average of at least about 2.5, preferably 3 of the hydroxyl radicals of glycerine are etherified or substituted by the hydroxypropyl (1-methyl-2-hydroxyethyl) radicals. The polyethylene glycol preferably has an average molecular weight on the order of 200–600, more preferably about 200–300.

A preferred composition according to the invention contains polyvinyl alcohol and, in percentages by weight of the polyvinyl alcohol content, about 7–17% of hydroxypropyl glycerine, and about 10–20% of polyethylene glycol. It is further preferred that the total proportion of the plasticizer combination of hydroxypropyl glycerine and polyethylene glycol be about 22–32%. It is presently preferred to employ about 12% of hydroxypropyl glycerine and 15% of polyethylene glycol for optimum results.

The foregoing materials constitute the essential ingredients of the composition. Additional materials may be included for release, surface activity, antiblocking and antifoaming purposes. Preferred additives include a fatty acid alkanolamide release agent in a proportion of about 1–2%, and an akyl aryl polyether alcohol nonionic surface-active agent in a proportion of about 0.1–0.5%. An antiblocking agent may be employed in a proportion of about 0.01–0.10%, and an antifoaming agent may be employed in a proportion of about 0.002–0.010%.

The invention provides an aqueous film casting composition of the foregoing composition dissolved in water. The solution preferably contains polyvinyl alcohol in a concentration of about 20–40% by weight. The invention also provides a new hot and cold water soluble self-sealing plasticized film produced from the casting composition. The film preferably has a thickness of about 0.5–5 mils, and contains about 3–18%, preferably 5–12% by weight volatiles, principally water. It is further preferred to employ increasing concentrations of polyvinyl alcohol in the casting composition for increasing film thicknesses, and the content of volatiles increases with increasing film thickness.

It is an important feature of the invention that the film may be produced from the casting composition by high speed commercial band casting processes. The film produced in this manner is ready for use after drying, and it has excellent properties. If desired, the film may be reoriented by multiplanar stretch techniques.

The invention provides very advantageous hot and cold water soluble laundry packets or the like comprising bags or pouches formed of the new film and containing one or more detergents, including anionic, cationic and nonionic detergents, and/or one or more bleaches, including the chlorine, perborate and persulfate types of bleaches. The invention is especially useful in packaging the water soluble granular anionic alkyl aryl sulfonate synthetic detergents, such as the alkali metal and alkaline earth metal salts of higher alkyl mono- or poly-nuclear aryl sulfonates having about 8–18 carbon atoms in the alkyl group, e.g., sodium dodecylbenzene sulfonate and sodium tridecylbenzene sulfonate. Other detergents which may be packaged advantageously according to the invention include the aryl and lower alkyl aryl sulfonates such as the benzene, toluene, xylene and naphthalene sulfonates. The invention also is especially useful in packaging the water soluble granular compounds which liberate hypochlorite chlorine on contact with water, such as the inorganic hypochlorites, e.g., lithium and calcium hypochlorite, the teterocyclic N-chloroimides, e.g., potassium dichlorocyanurate and trichlorocyanuric acid, the hydantion *s*, e.g., 1,3-dichloro-5,5-dimethyl hydantoin, and trichloromelamine.

The new packets provide for dispensing predetermined quantities of dry materials such as detergents, bleaches, and other materials as described above. The packets may be dropped into hot or cold water, whereupon the bags disintegrate to release the contents and thereafter the film material dissolves completely, both disintegration and dissolution occurring very rapidly. For example, the bags are completely soluble at temperatures above the freezing point of water, and they will dissolve completely within 60 seconds at temperatures as low as 70° F. and below with moderate agitation. The new packets avoid the disadvantages of handling bulk dry and liquid materials in laundry applications, and the polyvinyl alcohol contributes soil anti-redeposition properties to the medium. The packets have a long shelf life, are resistant to gas and vapor permeation, and are resistant to oil and grease. Where additional barrier protection is desired, as in packaging certain detergents and bleaches, the packages may be enveloped in impermeable containers constructed of polyethylene, metal foil or the like.

The following examples are furnished to assist in providing a complete understanding of the invention. It will be understood that the invention is not limited to the examples or to the procedures, materials, proportions and conditions set forth therein, which are merely illustrative. Unless otherwise stated, the proportions are by weight.

EXAMPLE I

A film casting composition is prepared from the following materials.

| Material: | Parts by wt. |
|---|---|
| Polyvinyl alcohol [1] | 100 |
| Hydroxypropyl glycerine [2] | 12 |
| Polyethylene glycol [3] | 15 |
| Fatty acid diethanolamide [4] | 1.5 |
| Isooctyl phenyl polyethoxy ethanol [5] | 0.34 |
| Magnesium stearate [6] | 0.02 |
| Emulsified silicone [7] | 0.005 |
| Water | 285 |

[1] Elvanol 52-22, hydrolyzed polyvinyl acetate having 87–89% of the acetate groups of polyvinyl acetate replaced by hydroxyl groups and having 19.5–22% by weight residual acetate; viscosity of a 4% aqueous solution at 20° C., 21–25 centipoises.
[2] Hyprin GP-30, tri(1-methyl-2-hydroxyethyl)glyceryl ether having a molecular weight of 266.4 and the formula:

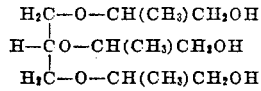

viscosity, 62 centistokes at 60° C. and 758 centistokes at 25° C.
[3] Molecular weight range of about 190 to 210, averaging about 200; viscosity, 4.3 centistokes at 210° F.
[4] Emcol 5130, release agent.
[5] Triton X-100, surface-active agent, containing 9 to 10 ethylene oxide units.
[6] Antiblocking agent.
[7] Antifoam AF, defoamer.

The composition is prepared by mixing the materials and agitating the mixture while raising the temperature from about 70° F. to 195° F. until solution is complete.

Inasmuch as the commercial band casting conditions are much more strenuous than the common laboratory casting procedures, e.g., casting a film on a plate and drying relatively slowly, the above composition was cast on a band casting machine of the type disclosed in the E. M. Kratz U.S. Patents Nos. 2,316,173, 2,346,764 and 2,421,073, employing a knife edge and a stainless steel unit to produce a plasticized film 0.0013–0.0017 inch thick when dry. The film was dried for about 2–3 minutes in a hot air stream at a temperature ranging from about 300° F. to 500° F. to produce a volatiles content of about 5–10%.

Film prepared in the foregoing manner was tested for sealing properties employing an electrical impulse heated sealing bar. Prior to testing, the film was conditioned by maintaining it at a temperature of about 74° F. and a relative humidity of about 50% for at least 24 hours, after which the film had a volatiles content of about 5–9% by weight determined by difference after drying at 185° F. for 1 hour. Two layers of film were placed in contact and sealed together along a 3″ x ⅛″ seal line under pressure of 25–45 p.s.i.g. An excellent seal was produced at 300–310° F. with a 0.7 second impulse. These values are within the preferred ranges of 320° F. ±20° F. and 0.7±0.1 second impulse for conventional bag machines. The films exhibited no exudation.

Representative film prepared in the foregoing manner when tested for physical properties exhibited a tensile strength in the range of 5710–7210 p.s.i., an enlongation of 290–380%, a 100% modulus of 3310–3410, and a tear resistance of 1495–1782 gm. per mil.

Bags made from the film were subjected to accelerated low temperature impact tests simulating extreme conditions which are encountered in use. In each test, bags 3″ x 4″ were filled with 2 ounces of a highly desiccant detergent and sealed. The detergent selected was Tide, containing an anionic alkyl aryl sulfonate, as described in U.S. Patent 2,712,529. The bags had one folded and three heat sealed sides. The resulting packets were conditioned and subjected to low temperature conditions in polyethyl-ene pouches formed of 2 mil thickness film and having slightly greater dimensions. The packets enclosed by the pouches were tested immediately upon removal from the low temperature environment by dropping 5 times for a distance of 6 feet onto a hard smooth surface.

In Test I, the detergent filled packets were first sealed in the polyethylene pouches, by heat sealing the polyethylene layers together. The units were maintained at 72° F. and 50% relative humidity for 48 hours, and then were maintained at 0° F. for 24 hours. In Test II, the packets containing detergent were maintained at 120° F. and 15% relative humidity for 48 hours. They were then sealed in polyethylene pouches and maintained at 0° F. for 24 hours. In Test III, the packets containing detergent were maintained at 80° F. and 15% relative humidity for 48 hours. The packets then were sealed in polyethylene pouches and maintained at 20° F. for 24 hours. Excellent results were obtained; no breakage of the bags containing detergent occurred in Tests I and III, and the breakage in Test II was less than 2%.

The above packets of polyvinyl alcohol film bags containing detergent were subjected to static and dynamic water rupture tests. Prior to filling the bags with detergent, the bags were conditioned by maintaining at a temperature of about 74° F. and a relative humidity of about 50% for a minimum of 24 hours, after which they had a volatiles content of about 5–9%. In the static test, the packets were suspended in deionized water at 90° F., and the elapsed time until the detergent flowed from the ruptured bags was noted. It was found that such release occurred in 40 to 50 seconds. In the dynamic test, the packets were dropped into an automatic washer containing deionized water at 100° F., during agitation on the delicate cycle. The elapsed time until the bags ruptured was noted. The bags ruptured to release the contents in 15–25 seconds. The static and dynamic rupture times were well within the respective times of 75 to 60 seconds. The periods of time required for rupture decrease as the temperature increases. Thus, the packages rupture in the static test in about 10 seconds at 140° F., the desired rupture time being within 45 seconds.

Packets of the polyvinyl alcohol film bags containing a detergent or a bleach exhibited good rupture and solubility properties and no discoloration in shelf life tests. The bags were filled with one of the products Tide, Dash, Action Bleach, and Stardust.

The polyvinyl alcohol film was conditioned at 74° F. and 50% relative humidity, after which its volatiles content was about 5–9%, and the times required for dissolution of the film in water at various temperatures were determined. Film strips of 2″ x 4″ size were immersed in deionized water, and the water was agitated with a glass stirring rod rotated at 200 r.p.m. The film strips dissolved completely in 60 seconds at 33° F., in 20–30 seconds at 75° F., in 15–20 seconds at 100° F., and in 15 seconds at 140° F.

EXAMPLE II

A film casting composition is prepared and plasticized film is produced therefrom in the manner of Example I, from the following materials.

| Material: | Parts by wt. |
|---|---|
| Polyvinyl alcohol [1] | 100 |
| Hydroxypropyl glycerine [2] | 15 |
| Polyethylene glycol [3] | 10 |
| Fatty acid diethanolamide [4] | 1.5 |
| Isooctyl phenyl polyethoxy ethanol [5] | 0.34 |
| Magnesium stearate [6] | 0.02 |
| Emulsified silicone [7] | 0.005 |
| Water | 285 |

[1-7] Same as Example I.

In place of the polyvinyl alcohol employed above and in Example I, Elvanol 50–42 polyvinyl alcohol may be employed. This material is hydrolyzed polyvinyl acetate having 87–89% of the acetate groups replaced by hydroxyl groups, a residual acetate content of 19.5–22.7% by weight, and a viscosity of 35–45 centipoises. Film produced from this higher viscosity material performed equally well with slightly higher dissolution times. Hydroxypropyl glycerine having an average substitution of about 2.5 hydroxypropyl radicals, such as Hyprin GP-25, may be employed in place of the tri-substituted compound in these examples. Polyethylene glycol having an average molecular weight of about 300 may be employed in place of the 200 average molecular weight compound in these examples.

EXAMPLE III

A film casting composition is prepared and plasticized film is produced therefrom in the manner of Example I, employing the following materials.

| Material: | Parts by wt. |
|---|---|
| Polyvinyl alcohol [1] | 100 |
| Hydroxypropyl glycerine [2] | 15 |
| Polyethylene glycol [3] | 10 |
| Isooctyl phenyl polyethoxy ethanol [5] | 0.25 |
| Magnesium stearate [6] | 0.05 |
| Water | 350 |

[1-3,5,6] Same as Example I.

Film was cast from the composition and tested as in Example I. The film passed the sealing, exudation, low temperature impact and solubility tests.

Film produced from casting compositions which were prepared in the above manner but employing from 15 to 30 parts of hydroxypropyl glycerine in the absence of polyethylene glycol, and 15 to 30 parts of polyethylene glycol in the absence of hydroxypropyl glycerine, exhibited from 12% to 50% breakage for the former and from 25% to 75% breakage for the latter in low temperature impact Test II, which results are unsatisfactory for commercial use. When the tests were repeated with the substitution of low viscosity Elvanol 51–05 polyvinyl alcohol (hydrolyzed polyvinyl acetate having 87.7–89% of the acetate groups replaced by hydroxyl groups, a residual acetate content of 19.5–21.5%, and a viscosity of 4–6 centipoises), 100% breakage was observed in Test II.

The new polyvinyl alcohol film is very useful for packaging low suds detergents having the following approximate composition.

| Materials: | Percent by wt. |
|---|---|
| Detergent mixture of sodium dodecylbenzene sulfonate, sodium benzene sulfonate, sodium toluene sulfonate, and ethylene oxide condensation product | 20–25 |
| Phosphates, e.g., sodium tripolyphosphate | 50 |
| Sodium sulfate and sodium silicate | 20 |
| Miscellaneous additives | Bal. |

The polyvinyl alcohol film also is employed very advantageously for packaging bleaches liberating hypochlorite chlorine.

The following composition is representative of such a bleach.

| Material: | Percent by wt. |
|---|---|
| Pentasodium tripolyphosphate | 30 |
| Sodium dedecylbenzene sulfonate | 4 |
| Sodium carbonate | 5 |
| Sodium sulfate | 48 |
| Potassium dichlorocyanurate | 13 |

The invention thus provides a new and improved polyvinyl alcohol composition and a plasticized film produced therefrom. The film is especially useful for producing water soluble bags which may contain various materials to be dispersed in water. The film has excellent physical properties which are retained under varying atmospheric conditions and, especially, in the presence of desiccant materials.

Having described only typical forms of the invention, it is not our intent to be limited to the specific details herein set forth. Rather, we wish to reserve to ourselves any variations or modifications that may appear to those skilled in the art and fall within the scope of the following claims.

We claim:

1. A hot and cold water soluble laundry packet which comprises a sealed bag of a polyvinyl alcohol film containing in percentages by weight of the polyvinyl alcohol content, a plasticizer combination of about 7–17% hydroxypropyl glycerine and about 10–20% of a low molecular weight polyethylene glycol, the total proportion of plasticizer combination being about 22–32% eneveloping a water soluble granular synthetic detergent selected from the group consisting of anionic, nonionic and cationic detergents.

2. A hot and cold water soluble laundry packet which comprises a sealed bag formed of a polyvinyl alcohol film formed of polyvinyl alcohol prepared by replacement of 85–90% of the acetate groups by hydroxyl groups, said polyvinyl alcohol having a viscosity of about 20–45 centipoises in 4% aqueous solution at 20° C., plasticized with, in percentages by weight of the polyvinyl alcohol content, a plasticizer combination of about 7–17% of substantially tri(1-methyl-2-hydroxyethyl)glyceryl ether, and about 10–20% of polyethylene glycol having a molecular weight of about 200–600, the total proportion of said plasticizer combination being about 22–32% enveloping a water soluble granular anionic alkyl aryl sulfonate synthetic detergent.

3. A hot and cold water soluble laundry packet which comprises a sealed bag formed of a polyvinyl alcohol film according to claim 2 enveloping a water soluble granular bleaching compound selected from the group consisting of the chlorine, perborate, persulfate, the inorganic hypochlorites, the heterocyclic N-chlorimides, the hydantoins and trichlormelamine.

4. A hot and cold water soluble laundry packet which comprises a sealed bag formed of a polyvinyl film according to claim 2 enveloping a water soluble granular compound liberating hypochlorite chlorine on contact with water.

References Cited
UNITED STATES PATENTS 2,850,471  9/1958  Klein.
2,990,398  6/1961  Inskip et al.

OTHER REFERENCES

Wearn: "Film Packets for Detergents," Soap-Chem. Specialties, January 1961, pages 123, 125, 127.

LEON D. ROSDOL, *Primary Examiner.*

W. E. SCHULZ, *Assistant Examiner.*